United States Patent [19]

Schwander

[11] 4,448,719
[45] May 15, 1984

[54] TRIFLUOROMETHYL-SUBSTITUTED MONOAZO DISPERSE DYES

[75] Inventor: Hansrudolf Schwander, Riehen, Switzerland

[73] Assignee: Ciba-Geigy Corporation, Ardsley, N.Y.

[21] Appl. No.: 274,910

[22] Filed: Jun. 18, 1981

[30] Foreign Application Priority Data

Jun. 20, 1980 [CH] Switzerland ........................ 4752/80

[51] Int. Cl.³ .................... C09B 29/01; C09B 29/085; D06P 1/18; D06P 3/36
[52] U.S. Cl. .................................. 260/152; 260/207; 260/207.1; 260/207.5; 8/639
[58] Field of Search ............ 260/205, 206, 207, 207.1, 260/207.5, 152; 8/639

[56] References Cited

U.S. PATENT DOCUMENTS

| | | | |
|---|---|---|---|
| 3,406,165 | 10/1968 | Kruckenberg | 260/207.1 |
| 3,840,517 | 10/1974 | Weaver et al. | 260/157 |
| 4,152,114 | 5/1979 | Koller et al. | 260/205 X |
| 4,321,055 | 3/1982 | Hansen et al. | 260/207 X |
| 4,327,999 | 5/1982 | Koller et al. | 260/208 X |

FOREIGN PATENT DOCUMENTS

| | | | |
|---|---|---|---|
| 36081 | 2/1981 | European Pat. Off. | 260/207.1 |
| 2101912 | 7/1971 | Fed. Rep. of Germany | 260/207.1 |
| 2310745 | 9/1974 | Fed. Rep. of Germany | 260/207.1 |
| 2916137 | 10/1980 | Fed. Rep. of Germany | 260/207.1 |
| 1190641 | 11/1957 | France | 260/207.1 |
| 1412922 | 11/1975 | United Kingdom | 260/207.1 |
| 1424331 | 2/1976 | United Kingdom | 260/207.1 |
| 2026012 | 7/1979 | United Kingdom | 260/207.1 |

*Primary Examiner*—Floyd D. Higel
*Attorney, Agent, or Firm*—Edward McC. Roberts

[57] ABSTRACT

The patent discloses novel monoazo compounds, and mixtures of monoazo compounds, of the formula

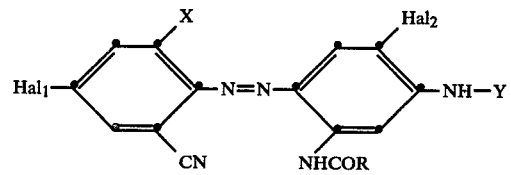

in which $Hal_1$ and $Hal_2$ independently of one another are each a halogen atom, X is a $CF_3$, CN or $SO_2$—A group, in which A is a substituted or unsubstituted $C_1$–$C_4$-alkyl group or a di-($C_1$–$C_4$)-alkyl-amino group, in which the alkyl radicals can be substituted, R is a substituted or unsubstituted $C_1$–$C_4$-alkyl group or a substituted or unsubstituted $C_1$–$C_4$-alkoxy group and Y is a substituted or unsubstituted $C_1$–$C_8$-alkyl group or a substituted or unsubstituted $C_3$–$C_4$-alkenyl group, as well as processes for their preparation, and their use as dyes for dyeing and printing textile materials which are dyeable with disperse dyes, especially polyester materials. The dyeings obtained in particular have very good light fastness, brilliance, sublimation fastness and freedom from "catalytic fading".

8 Claims, No Drawings

TRIFLUOROMETHYL-SUBSTITUTED MONOAZO DISPERSE DYES

The present invention relates to novel monoazo compounds and to their mixtures with one another, to processes for their preparation, and to their use as dyes for dyeing and printing textile materials which are dyeable with disperse dyes.

The novel monoazo compounds have the formula I

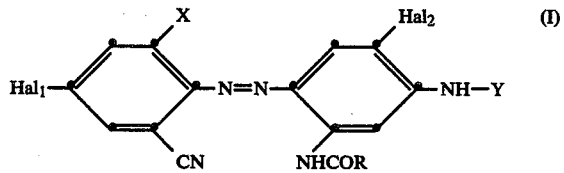

in which $Hal_1$ and $Hal_2$ independently of one another are each a halogen atom, X is the $CF_3$, CN or $SO_2$-A group, in which A is a substituted or unsubstituted $C_1$-$C_4$-alkyl group or a di-($C_1$-$C_4$)-alkyl-amino group, in which the alkyl radicals can be substituted, R is a substituted or unsubstituted $C_1$-$C_4$-alkyl group or a substituted or unsubstituted $C_1$-$C_4$-alkoxy group and Y is a substituted or unsubstituted $C_1$-$C_8$-alkyl group or a substituted or unsubstituted $C_3$-$C_4$-alkenyl group.

$Hal_1$ and $Hal_2$, as halogen atoms, are, independently of one another, fluorine, chlorine or bromine atoms. In preferred monoazo compounds, $Hal_1$ is a chlorine or bromine atom and $Hal_2$ is a chlorine atom.

X as a $—SO_2A$ group is a $—SO_2$—$(C_1$-$C_4)$-alkyl group, in which the alkyl moiety is unbranched or branched, and is thus, for example, $SO_2CH_3$, $SO_2C_2H_5$, $SO_2$—(n- or iso-)—$C_3H_7$ or $SO_2$—(n-, sec.- or tert.-)—$C_4H_9$. The alkyl radical can be substituted, for example by OH, halogen or CN. If the $—SO_2A$ group is an N,N-dialkylaminosulfonyl group, the two $(C_1$-$C_4)$-alkyl radicals can be identical or different, unsubstituted or substituted. Examples of suitable substituents are OH, CN or halogen. Thus the group can be, for example, one of the following radicals: $—SO_2N(CH_3)_2$, $—SO_2N(CH_3)(C_2H_5)$, $—SO_2N(C_2H_5)_2$, $—SO_2N(n$-$C_3H_7)_2$, $—SO_2N(CH_3)(C_2H_4OH)$ and $—SO_2N(n$-$C_4H_9)_2$.

In preferred monoazo compounds, X is a CN group and especially a $CF_3$ group or an $SO_2$—$(C_1$-$C_4)$-alkyl group.

R as a $C_1$-$C_4$-alkyl group is the $CH_3$, $C_2H_5$, n-$C_3H_7$, iso-$C_3H_7$, sec.-$C_4H_9$, tert.-$C_4H_9$ or n-$C_4H_9$ group, which alkyl groups can be substituted, for example by halogen, such as fluorine, chlorine or bromine, or by an alkoxy group, such as the methoxy, ethoxy or propoxy group. If R is a $C_1$-$C_4$-alkoxy group, it is, for example, the methoxy, ethoxy or propoxy group, which alkoxy groups can additionally be substituted, for example by another alkoxy group. In preferred monoazo compounds, R is an unsubstituted $C_1$-$C_4$-alkyl group, especially the methyl group.

Y, as a $C_1$-$C_8$-alkyl group, can be unbranched or branched, unsubstituted or substituted; it is, for example, the methyl, ethyl, n-propyl, iso-propyl, n-butyl, sec.-butyl, tert.-butyl or the n- or iso-pentyl, -hexyl, -heptyl or -octyl group. Examples of possible substituents thereof are OH; $C_1$-$C_4$-alkoxy which is unsubstituted or substituted by, for example, CN or another alkoxy; halogen, such as fluorine, chlorine or bromine; the CN group; the phenoxy group; the $—COO$-phenyl group; a $—COO$-alkyl group in which the alkyl moiety can be substituted by furyl, OH or alkoxy; the N(CO-alkyl)(alkyl) group, in which the alkyl moieties have 1 to 4 carbon atoms; a CON(alkyl)$_2$ group, in which the alkyl moieties can be identical or different, have 1 to 4 carbon atoms, and can be substituted, for example by OH; or the

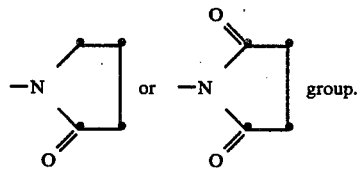

One or more of these substituents can be present in the alkyl radicals Y, and where more than one is present, they may be identical or different.

Y can also be a $C_3$-$C_4$-alkenyl group, for example the allyl group, which can be substituted, for example by halogen, such as fluorine, chlorine or bromine. In preferred monoazo compounds of the formula I, Y is a substituted $C_1$-$C_8$-alkyl group, especially a $C_1$-$C_4$-alkyl group substituted by OH, and in particular the β-hydroxypropyl group.

Monoazo compounds which have particularly good properties are those of the formula I, in which $Hal_1$ is a chlorine or bromine atom, $Hal_2$ is a chlorine atom, X is a CN—, $CF_3$—, $SO_2CH_3$—, $SO_2C_2H_5$—, $SO_2N(C_2H_5)_2$— or $SO_2N(CH_3)(C_2H_4OH)$ group, R is a $—CH_3$, $—OC_2H_5$, $—OC_2H_4OCH_3$ or $—CH_2OCH_3$ group and Y is a $C_2H_5$ group, which can be substituted by $—OC_2H_4CN$, $—OC_2H_4OCH_3$, $—OCH_3$, $—OC_2H_5$, $—O$—$C_6H_5$,

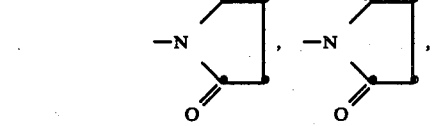

$—COOCH_3$, $—COOC_2H_5$, $—COOC_2H_4OH$, $—COOC_2H_4OCH_3$, $—COOC_2H_4OC_2H_5$,

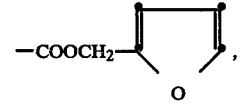

$—N(CH_3)(OCCH_3)$ or $—CON(CH_3)(C_2H_4OH)$ or Y is a $C_3H_7$ group, which can carry one or more identical or different substituents chosen from OH, Cl, CN, $OC_6H_5$, $OC_4H_9$, $COOC_6H_5$, $COOCH_3$ and $COOC_2H_5$, or Y is a $C_4H_9$ group which is unsubstituted or substituted by OH, $COOCH_3$ or $COOC_2H_5$, or Y is a $—CH_2$—$CH=CH.Cl$ group.

However, particularly preferred monoazo compounds are those of the formula

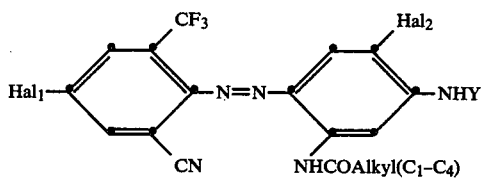

in which $Hal_1$, $Hal_2$ and Y have the meanings given under formula I.

The novel monoazo compounds of the formula I can be prepared according to various methods, for example by reacting 1 mol of a compound of the formula II

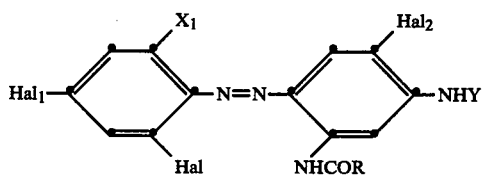

or of a compound of the formula IIa

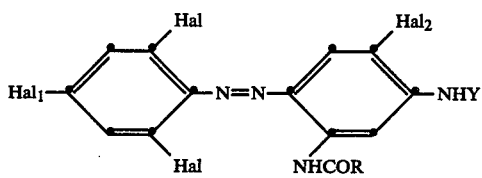

in which $X_1$ is a $CF_3$ or $SO_2$-A group and Hal, independently of $Hal_1$ and $Hal_2$, is a halogen atom, and the remaining symbols are as defined under formula I, with 1 or 2 mols of a metal cyanide.

The reaction with metal cyanides, preferably with copper cyanide, is preferably carried out in an aprotic polar solvent such as dimethylsulfoxide, dimethylformamide or N-methylpyrrolidone, at a temperature of about 40° to 150° C., preferably 80° to 130° C.

The preferred starting material is a compound of the formula II or IIa, in which Hal and $Hal_1$ are bromine, $X_1$ is a $CF_3$ group, $Hal_2$ is a chlorine atom, R is an unsubstituted $C_1$-$C_4$-alkyl group, especially the methyl group, and Y is a substituted $C_1$-$C_8$-alkyl group, especially an OH-substituted $C_1$-$C_4$-alkyl group.

The compounds of the formula II and IIa are also novel and can be prepared by diazotising an amine of the formula

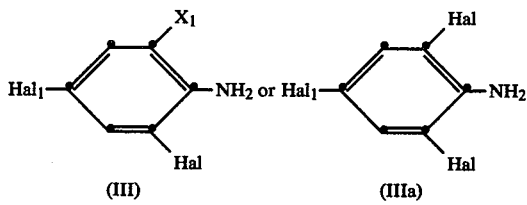

and coupling the diazotised compounds to a coupling component of the formula IV

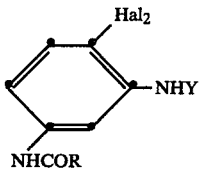

in which $Hal_1$, $X_1$, Hal, $Hal_2$, Y and R are as defined above.

The diazotisation reaction and coupling reaction are carried out in a known manner, for example as described in Ullmanns Encyklopädie der technischen Chemie, Volume 5 (1954), pages 783 et seq.

The amines of the formula (III) or (IIIa) are obtained by halogenating, for example brominating, an aniline compound of the formula

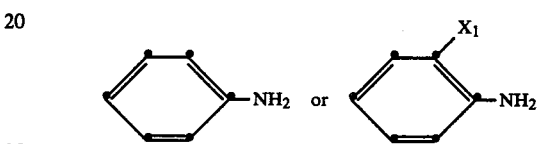

in glacial acetic acid or HCl at a temperature of about 20°–25° C.

The coupling components of the formula (IV) are obtained, for example, by introducing the radical Y into an aniline derivative of the formula

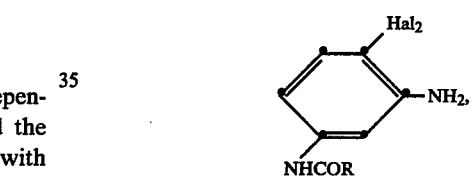

for example by means of an epoxide corresponding to Y, or by condensing with a compound Hal—Y.

If the radical Y in the compound of the formula I still contains halogen atoms or a hydroxyl group these can, if desired, subsequently be converted to a cyanide group or a carboxylic acid ester group respectively.

Another possible way of preparing a monoazo compound of the formula I is to diazotise an amine of the formula V

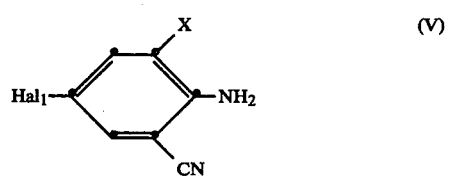

and coupling the diazotised product with a coupling component of the formula VI

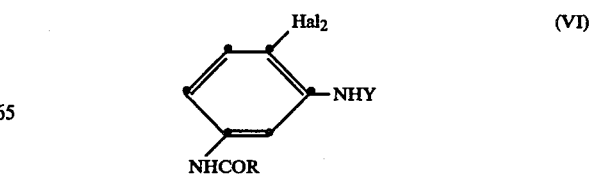

in which the symbols are as defined under formula I.

The amines of the formula V are known or can be prepared by known methods, for example by reacting one mol of an amine of the formula

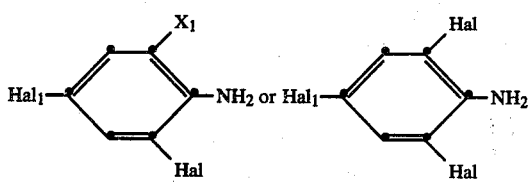

with one or two mols of a metal cyanide, especially copper cyanide, as described.

The coupling components of the formula VI are also known or can be prepared according to known methods.

Amongst the large number of intermediates of the formulae II to VI, several are described in the examples.

The novel monoazo compounds of the formula I and their mixtures with one another are in particular used as dyes for dyeing and printing materials, especially textile materials which are dyeable with disperse dyes. Before use, the dyes are advantageously converted to dye preparations. For this purpose, they can be comminuted to give a mean particle size of between 0.01 and 10 microns. The comminution can be carried out in the presence of dispersants. For example, the dried dye is milled with a dispersant or kneaded, in paste form, with a dispersant, and the mixture is then dried in vacuo or by spray-drying. The preparations thus obtained can then be mixed with water and used for dyeing, padding or printing from a long liquor (liquor ratio greater than 5:1) or a short liquor (liquor ratio 1:1 to 5:1).

The novel monoazo compounds are excellently absorbed from aqueous suspensions onto shaped articles consisting of fully synthetic or semi-synthetic high-molecular materials. The dyes are particularly suitable for dyeing, padding or printing fibres, filaments, non-wovens, woven fabrics or knitted fabrics consisting of linear aromatic polyesters or of cellulose 2½-acetate or cellulose triacetate. Synthetic polyamides, polyolefins, acrylonitrile polymerisation products and polyvinyl compounds can also be dyed and printed with the dyes. Particularly valuable dyeings are obtained on linear, aromatic polyesters. The latter are, in general, polycondensates of terephthalic acid and glycols, especially ethylene glycol, or of terephthalic acid and 1,4-bis-(hydroxymethyl)-hexahydrobenzene.

The polyester fibres are dyed by processes known per se, in the presence of carriers, at temperatures between 80° and 125° C. or in the absence of carriers under pressure at about 100° to 140° C., using the exhaustion method. Further, the fibres can be padded or printed with aqueous dispersions of the monoazo compounds, after which the impregnated fibres obtained are subjected to fixing at about 140° to 230° C., for example by means of steam, contact heat or hot air. Cellulose 2½-acetate is preferably dyed at between about 65° and 85° C. and cellulose triacetate at temperatures of up to 115° C.

In most cases, the conventional dispersants are added, which are preferably anionic or non-ionic and can also be used as mixtures with one another.

Examples of known anionic dispersants which can be used for the process are condensates of naphthalene-sulfonic acids and formaldehyde, especially dinaphthyl-methanedisulfonates, esters of sulfonated succinic acid, turkey red oil, alkali metal salts of sulfuric acid esters of fatty alcohols, for example sodium lauryl-sulfate or sodium cetyl-sulfate, sulfite cellulose waste liquors and their alkali metal salts, soaps and alkali metal salts of sulfuric acid esters of fatty acid monoglycerides. Examples of known and particularly suitable non-ionic dispersants are adducts of about 3 to 40 mols of ethylene oxide with alkylphenols, fatty alcohols or fatty amines, and the neutral sulfuric acid esters of such adducts.

For padding and printing, the customary thickeners are used, for example modified or unmodified natural products, for example alginates, British gum, gum arabic, crystal gum, locust bean flour, tragacanth, carboxymethylcellulose, hydroxyethylcellulose, starch and synthetic products, for example polyacrylamides and polyvinyl alcohols.

The dyeings obtained have good general fastness characteristics, such as thermofixing fastness, pleating fastness, chlorine fastness and wet fastness, for example water fastness, wash fastness and perspiration fastness; properties which deserve particular mention are their good light fastness, brilliance and sublimation fastness and especially the fact that the dyes can be mixed with any blue dyes and do not show any "catalytic fading" when such mixtures are applied to textile materials.

The examples which follow illustrate the invention without implying a limitation thereto; temperatures are given in degrees centigrade and parts are by weight, unless stated otherwise.

EXAMPLE 1

A solution of 67.2 g of bromine in 20 ml of acetic acid is added dropwise, in the course of 2–3 hours, to a well-stirred mixture consisting of 32.2 g of 2-amino-benzotrifluoride and 140 ml of 18% hydrochloric acid at a temperature of 20°–25°. The resulting suspension is stirred for a further hour at room temperature, and the resulting product, of the formula

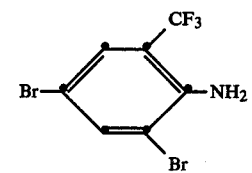

is filtered off, and washed with 18% hydrochloric acid and finally with water. After having been dried in vacuo at room temperature, the product is obtained in the form of colourless crystals which dissolve easily in, for example, ethyl-cellosolve.

EXAMPLE 2

165 g of 2-amino-benzotrifluoride are run into 1,000 g of 65% sulfuric acid at a temperature of 60°–65°, resulting in a colourless suspension. 500 g of 36% hydrochloric acid are then added at 60°, whereupon a solution is obtained. 220 g of 35% hydrogen peroxide are then added dropwise in the course of about 1½ hours at a temperature of 58°–60°, cooling during the addition being necessary. The mixture is then stirred for a further hour at the same temperature, after which the organic phase is separated off. The latter is washed four times with 50 ml of water at a time, until the water reacts neutral to Congo Red; the organic phase is then dried over magnesium sulfate and fractionally distilled through a Vigreux column. The product of the formula

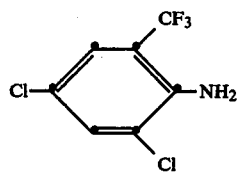

is obtained as a mobile oil, boiling point 93°–95°/15 mm Hg.

EXAMPLE 3

A mixture consisting of 55.35 g of 2-amino-4-acetylamino-1-chloro-benzene, 44 g of 2-chloro-2'-cyano-diethyl ether, 6.6 g of magnesium oxide and 30 ml of ethyl-cellosolve is stirred at 110° until only a trace of the educt 2-amino-4-acetylamino-1-chloro-benzene remains detectable in a thin layer chromatogram. The mixture is then diluted with acetic acid to a volume of 450 ml. This gives a solution containing the product of the formula

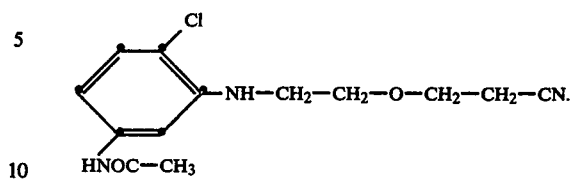

This solution can be employed direct for azo coupling reactions.

If the procedure described above is repeated but instead of 2-chloro-2'-cyano-diethyl ether equivalent amounts of the halogen compounds listed in column I of Table 1 below are employed, corresponding solutions of the products listed under II are obtained. Where such products possess free hydroxyl groups, a solvent other than acetic acid, for example ethyl-cellosolve or dimethyl-sulfoxide, is used.

TABLE 1

| No. | I Halogen compound | II Y (in structure with Cl, NH–Y, HNOC–CH₃) |
|---|---|---|
| 4 | Cl—C₂H₄—OOC—CH₃ | —C₂H₄—OOC—CH₃ |
| 5 | Br—C₂H₄—OCC—CH₃ | " |
| 6 | Cl—C₂H₄—OOC—C₂H₅ | —C₂H₄—OIOC—C₂H₅ |
| 7 | Br—C₂H₄—OOC—C₂H₅ | —C₂H₄—OOC—C₂H₅ |
| 8 | Cl—C₂H₄—OOC—C₂H₄—OH | —C₂H₄—OOC—C₂H₄—OH |
| 9 | Br—C₂H₄—OOC—C₂H₄—OH | " |
| 10 | Cl—CH₂—CH₂—CH₂OH | —CH₂—CH₂—CH₂—OH |
| 11 | Br—CH₂—CH₂—CH₂—OH | " |
| 12 | Cl—CH₂—CH₂—CH₂—CH₂—OH | —CH₂—CH₂—CH₂—CH₁₂—OH |
| 13 | Br—CH₂—CH₂—CH₂—CH₂—OH | " |
| 14 | Cl—C₂H₄—O—CH₃ | —C₂H₄—O—CH₃ |
| 15 | Cl—C₂H₄—O—CH₃ | —C₂H₄—O—C₂H₅ |
| 16 | Cl—C₂H₄—O—C₂H₄—OCH₃ | —C₂H₄—O—C₂H₄—OCH₃ |
| 17 | Br—C₂H₄—O—(phenyl) | —C₂H₄—O—(phenyl) |
| 18 | Cl—C₂H₄—N(succinimido) | —C₂H₄—N(succinimido) |
| 19 | Cl—C₂H₄—N(pyrrolidinone) | —C₂H₄—N(pyrrolidinone) |
| 20 | Cl—C₂H₄—N(OC—CH₃)(CH₃) | —C₂H₄—N(OC—CH₃)(CH₃) |

TABLE 1-continued

| | | II |
|---|---|---|
| I | | Cl—⟨benzene⟩—NH—Y, HNOC—CH₃ |
| No. | Halogen compound | Y |
| 21 | Cl—C₂H₄—CON(CH₃)(C₂H₄—OH) | —C₂H₄—CON(CH₃)(C₂H₄—OH) |
| 22 | Cl—C₂H₄—COOCH₃ | —C₂H₄—COOCH₃ |
| 23 | Cl—C₂H₄—COOC₂H₅ | —C₂H₄—COOC₂H₅ |
| 24 | Cl—C₂H₄—COO—C₂H₄—OH | —C₂H₄—COO—C₂H₄—OH |
| 25 | Cl—C₂H₄—COO—C₂H₄—OCH₃ | —C₂H₄—COO—C₂H₄—OCH₃ |
| 26 | Cl—C₂H₄—COO—C₂H₄—O—C₂H₅ | —C₂H₄—COO—C₂H₄—O—C₂H₅ |
| 27 | Cl—C₂H₄—COO—CH₂—(furyl) | —C₂H₄—COO—CH₂—(furyl) |
| 27a | —Cl—CH₂—CH=CHCl | —CH₂—CH=CHCl |

EXAMPLE 28

14.4 g of 2-methoxyethyl chlorocarbonate are added dropwise, at a temperature of 8°–10°, to a vigorously stirred mixture consisting of 14.2 g of 1-chloro-2,4-diamino-benzene, 40 ml of chlorobenzene and 20 ml of water, the pH value being kept at 6.5–7 by adding sodium carbonate solution. The mixture is stirred for a further 30 minutes under the same conditions and the acylation is checked by means of a thin layer chromatogram. If the latter still shows educt, further acid chloride is added and the reaction continued under the same conditions as above.

To isolate the product, the aqueous phase is separated off, the chlorobenzene is removed in vacuo and the crude product is purified by recrystallisation from ethyl-cellosolve. The product of the formula

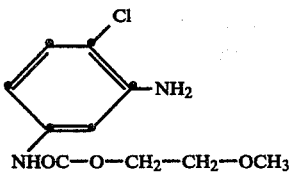

is obtained in the form of colourless crystals, which easily dissolve in dimethylformamide.

If the above procedure is repeated but instead of the above chlorocarbonic acid ester equivalent amounts of ethyl chlorocarbonate or methoxyacetyl chloride are used, the compounds of the formula

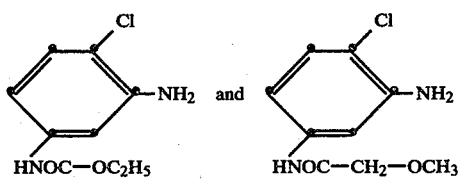

are respectively obtained.

EXAMPLE 29

A mixture consisting of 73.5 g of the compound of the formula

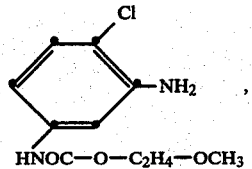

49.4 g of n-butyl bromide, 6.6 g of magnesium oxide and 60 ml of ethylcellosolve is stirred at a temperature of 110°–112° until only traces of educt remain detectable in a thin layer chromatogram. After completion of the reaction, the mixture is diluted with acetic acid and brought thereby to a volume of 450 ml. The solution obtained, which contains the product of the formula

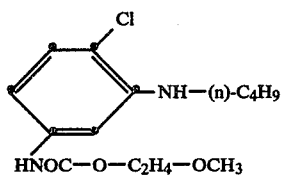

can be used direct for azo couplings.

If the above procedure is repeated but in place of the above educt equivalent amounts of the two products mentioned in the preceding Example 28 are used, solutions which contain the products of the formulae

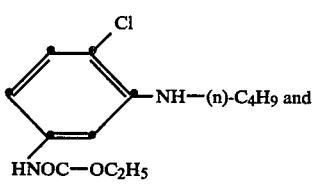

and

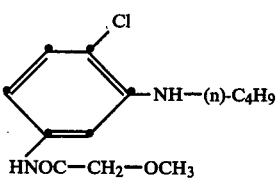

are respectively obtained.

EXAMPLE 30

12.8 g of propylene oxide are added dropwise to a mixture consisting of 49 g of the compound of the formula

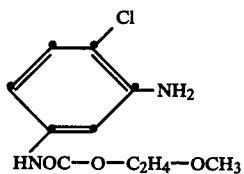

and 100 g of acetic acid in the course of about 1½ hours at a temperature of 40°–42°, after which stirring is continued for 1 hour and the mixture is then tested for educt by means of a thin layer chromatogram. If educt is still detectable, further propylene oxide is added and the reaction is continued under the same conditions until at most traces of educt remain detectable.

After completion of the reaction, the volume is made up to 200 ml with acetic acid. The solution obtained contains the compound of the formula

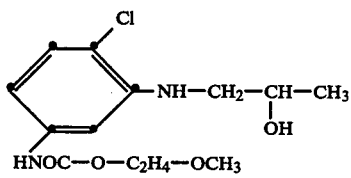

and can be used direct for azo couplings.

If the same procedure is repeated but in place of the educt employed above, equivalent amounts of the compounds of the formulae

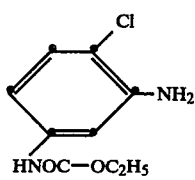

-continued and

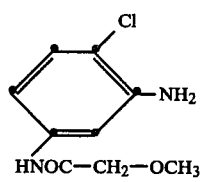

are employed, solutions which contain the compounds of the formulae

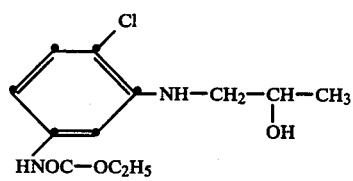

and

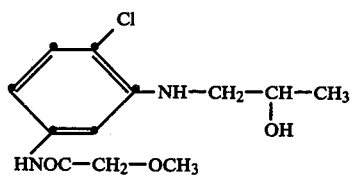

are respectively obtained.

EXAMPLE 31

28.6 g of butyl glycidyl ether are added dropwise in the course of about 1½ hours to a mixture consisting of 36.9 g of 3-amino-4-chloroacetanilide and 80 g of acetic acid at a temperature of 40°–42°, after which stirring is continued at the same temperature for 2 hours. The mixture is checked for educt by means of a thin layer chromatogram, and, if necessary, more glycidyl ether is added, until at most traces of educt remain detectable. The mixture is diluted with acetic acid to a volume of 200 ml, giving a solution which contains the product of the formula

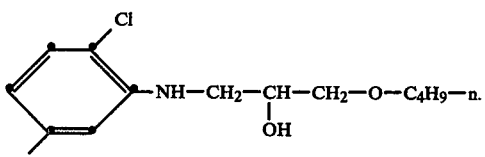

This solution can be used direct for azo couplings.

If the above procedure is repeated except that in place of butyl glycidyl ether equivalent amounts of the epoxides listed in column I of Table 2 below are used, the products listed under column II are obtained in the form of corresponding solutions.

TABLE 2

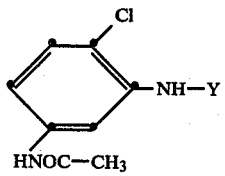

| No. | I Epoxide | Y |
|---|---|---|
| 32 | H₂C—CH—CH₂OH (epoxide) | —CH₂—CH(OH)—CH₂—OH |
| 33 | H₂C—CH—CH₂—OOC—CH₃ (epoxide) | —CH₂—CH(OH)—CH₂—OOC—CH₃ |
| 34 | H₂C—CH—CH₂—OOC—C₂H₅ (epoxide) | —CH₂—CH(OH)—CH₂—OOC—C₂H₅ |
| 35 | H₂C—CH—CH₂—OOC—C₆H₅ (epoxide) | —CH₂—CH(OH)—CH₂—OOC—C₆H₅ |
| 36 | H₂C—CH—CH₂—Cl (epoxide) | —CH₂—CH(OH)—CH₂—Cl |

EXAMPLE 37

5.1 g of nitrosylsulfuric acid, as a 40% solution in sulfuric acid, is run into a mixture consisting of 10.85 g of 2,6-dibromo-4-chloroaniline and 60 ml of a mixture of 5 parts of acetic acid and 1 part of propionic acid at a temperature of 0°–5°. The batch is stirred for 2 hours at 0°–5° and 0.5 g of urea are then added, followed, after 15 minutes, by 10.2 g of the compound of the formula

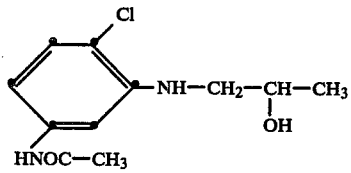

as a solution in acetic acid. The pH value is brought to 2 by adding 80 ml of 30% ammonium acetate solution, and the mixture is stirred at 0°–5° until coupling has ended. The pH is brought to 3.5 by adding 1 N NaOH and the precipitated coupling product of the formula

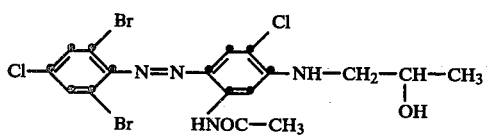

is filtered off. The filter residue is then suspended in 250 ml of water, the pH value is brought to 7 with sodium hydroxide solution, the mixture is then stirred for 30 minutes and the product is isolated by filtration. After having been dried in vacuo at 80°, the product of the above formula is obtained as a yellowish brown powder which gives a yellow solution in dimethylformamide.

If instead of the coupling component mentioned above, equivalent amounts of the coupling components of the formulae

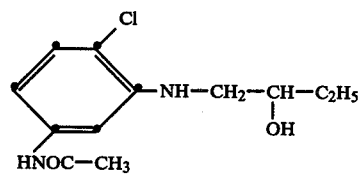

and

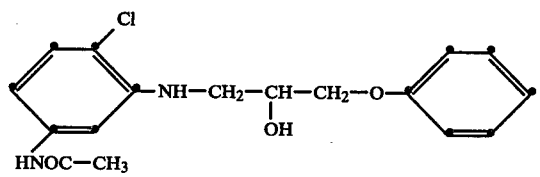

are used, the coupling products of the formulae

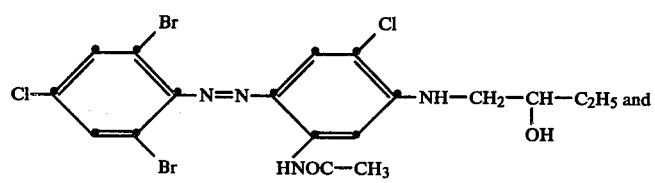

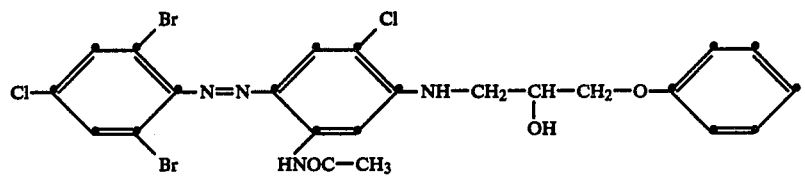

are respectively obtained.

If the procedure is repeated but in place of the coupling component employed above equivalent amounts of the coupling components described in the preceding Examples 3, 29 and 30 and Tables 1 and 2 are used, the coupling products shown in Table 3 are obtained.

TABLE 3

| No. | R | Y | Colour of solution in dimethylformamide |
|---|---|---|---|
| 38 | —CH$_3$ | —CH$_2$—CH$_2$—O—CH$_2$—CH$_2$—CN | yellow |
| 39 | " | —C$_2$H$_4$—OOC—CH$_3$ | " |
| 40 | " | —C$_2$H$_4$—OOC—C$_2$H$_4$—OH | " |
| 41 | " | —CH$_2$—CH$_2$—CH$_2$—OH | " |
| 42 | " | —CH$_2$—CH$_2$—CH$_2$—CH$_2$—OH | " |
| 43 | " | —C$_2$H$_4$—O—CH$_3$ | " |
| 44 | " | —C$_2$H$_4$—O—C$_2$H$_5$ | " |
| 45 | " | —C$_2$H$_4$—O—C$_2$H$_4$—OCH$_3$ | " |
| 46 | " | —C$_2$H$_4$—O—C$_6$H$_5$ | " |
| 47 | " | —C$_2$H$_4$—N(succinimido) | " |
| 48 | " | —CH$_2$—CH$_2$—N(pyrrolidinone) | " |
| 49 | " | —CH$_2$—CH$_2$—N(CH$_3$)(OC—CH$_3$) | " |
| 50 | " | —CH$_2$—CH$_2$—CON(CH$_3$)(CH$_2$—CH$_2$—OH) | " |
| 51 | " | —CH$_2$—CH$_2$—COOCH$_3$ | " |
| 52 | " | —CH$_2$—CH$_2$—COOC$_2$H$_5$ | " |
| 53 | " | —C$_2$H$_4$—COO—C$_2$H$_4$—OH | " |
| 54 | " | —C$_2$H$_4$—COO—C$_2$H$_4$—OCH$_3$ | " |
| 55 | " | —C$_2$H$_4$—COO—C$_2$H$_4$—O—C$_2$H$_5$ | " |
| 56 | " | —CH$_2$—CH$_2$—COO—CH$_2$—(furyl) | " |

TABLE 3-continued

[Structure: dichlorodibromo-phenyl-N=N-phenyl with NH-Y, HN-CO-R substituents]

| No. | R | Y | Colour of solution in dimethylformamide |
|---|---|---|---|
| 57 | —O—$C_2H_4$—$OCH_3$ | —$CH_2$—$CH_2$—$CH_2$—$CH_3$ | " |
| 58 | —$OC_2H_5$ | " | " |
| 59 | —$CH_2$—$OCH_3$ | " | " |
| 60 | —O—$C_2H_4$—$OCH_3$ | —$CH_2$—CH(OH)—$CH_3$ | " |
| 61 | —$OC_2H_5$ | " | " |
| 62 | —$CH_2$—$OCH_3$ | " | " |
| 63 | —$CH_3$ | —$CH_2$—CH(OH)—$CH_2$—O—$C_4H_9(n)$ | " |
| 64 | " | —$CH_2$—CH(OH)—$CH_2$—OH | " |
| 65 | " | —$CH_2$—CH(OH)—$CH_2$—OOC—$CH_3$ | " |
| 66 | " | —$CH_2$—CH(OH)—$CH_2$—OOC—$C_2H_5$ | " |
| 67 | " | —$CH_2$—CH(OH)—$CH_2$—OOC—phenyl | " |
| 68 | " | —$CH_2$—CH(OH)—$CH_2$—Cl | " |

EXAMPLE 69

12.75 g of 2-trifluoromethyl-4,6-dibromoaniline in 60 ml of a mixture of acetic acid and propionic acid are diazotised with 0.04 mol of nitrosylsulfuric acid analogously to the method described in Example 37. 0.04 mol of the compound of the formula

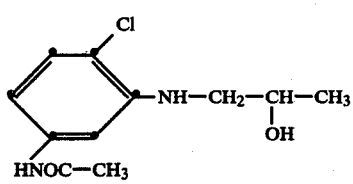

dissolved in acetic acid are added to the diazo solution at 0°, and after addition of ammonium acetate the coupling is carried out at pH 2. The coupling product of the formula

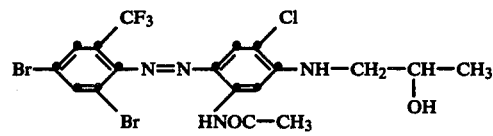

is isolated analogously to Example 37. The product is a yellowish brown powder which gives a yellow solution in dimethylformamide.

If the procedure described is repeated but in place of the coupling component employed above equivalent amounts of the coupling components of the formulae

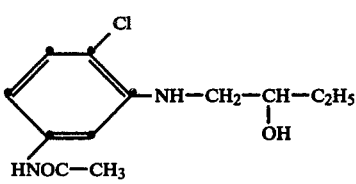

and are employed, the coupling products of the formulae

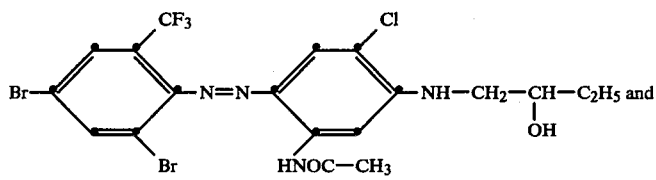

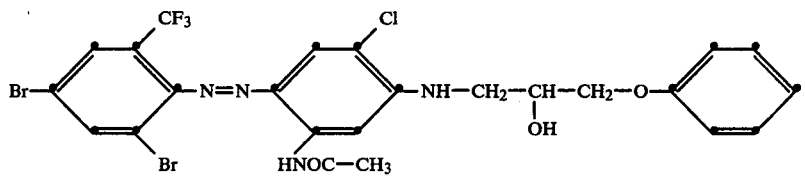

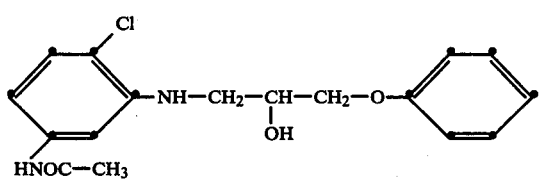

are respectively obtained.

If the procedure described is repeated but in place of the coupling components employed above, those described in the preceding examples and Tables 1 and 2 are employed, the coupling products shown in Table 4 are obtained.

TABLE 4

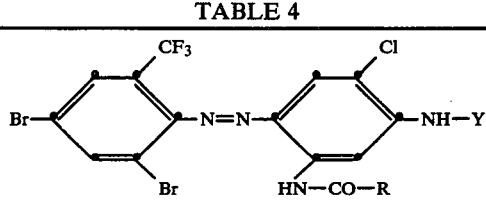

| No. | R | Y | Colour of solution in dimethylformamide |
|---|---|---|---|
| 70 | —CH₃ | —CH₂—CH₂—O—CH₂—CH₂—CN | yellow |
| 71 | " | —CH₂—CH₂—OOC—CH₃ | " |
| 72 | " | —C₂H₄—OOC—C₂H₄—OH | " |
| 73 | " | —CH₂—CH₂—CH₂—OH | " |
| 74 | " | —CH₂—CH₂—CH₂—CH₂—OH | " |
| 75 | " | —CH₂—CH₂—OCH₃ | " |
| 76 | " | —CH₂—CH₂—OC₂H₅ | " |
| 77 | " | —C₂H₄—O—C₂H₄—OCH₃ | " |
| 78 | " | —C₂H₄—O—(phenyl) | " |
| 79 | " | —C₂H₄—N(succinimide) | " |
| 80 | " | —C₂H₄—N(2-oxo-pyrrolidinyl) | " |
| 81 | " | —C₂H₄—N(CH₃)(OC—CH₃) | " |

TABLE 4-continued

[Structure: Br, CF₃, Br-substituted phenyl -N=N- Cl, NH-Y, HN-CO-R substituted phenyl]

| No. | R | Y | Colour of solution in dimethylformamide |
|---|---|---|---|
| 82 | " | -CH₂-CH₂-CON(CH₃)(CH₂-CH₂-OH) | " |
| 83 | " | -CH₂-CH₂-COOCH₃ | " |
| 84 | " | -CH₂-CH₂-COOC₂H₅ | " |
| 85 | " | -CH₂-CH₂-COO-C₂H₄-OH | " |
| 86 | " | -C₂H₄-COO-C₂H₄-OCH₃ | " |
| 87 | " | -C₂H₄-COO-C₂H₄-OC₂H₅ | " |
| 88 | " | -CH₂-CH₂-COO-CH₂-(tetrahydrofuryl) | " |
| 89 | -O-C₂H₄-OCH₃ | -CH₂-CH₂-CH₂-CH₃ | " |
| 90 | -OC₂H₅ | -CH₂-CH₂-CH₂-CH₃ | " |
| 91 | -CH₂-OCH₃ | " | " |
| 92 | -O-C₂H₄-OCH₃ | -CH₂-CH(OH)-CH₃ | " |
| 93 | -OC₂H₅ | " | " |
| 94 | -CH₂-OCH₃ | " | " |
| 95 | -CH₃ | -CH₂-CH(OH)-CH₂-O-C₄H₉-(n) | " |
| 96 | " | -CH₂-CH(OH)-CH₂-OH | " |
| 97 | " | -CH₂-CH(OH)-CH₂-OOC-CH₃ | " |
| 98 | " | -CH₂-CH(OH)-CH₂-OOC-C₂H₅ | " |
| 99 | " | -CH₂-CH(OH)-CH₂-OOC-C₆H₅ | " |
| 100 | " | -CH₂-CH(OH)-CH₂-Cl | " |

EXAMPLE 101

9.20 g of 2-trifluoromethyl-4,6-dichloroaniline in 60 ml of a mixture of acetic acid and propionic acid are diazotised with 0.04 mol of nitrosylsulfuric acid, in the form of a 40% solution in sulfuric acid, at 0°–5°, analogously to Example 37. 0.04 mol of the compound of the formula

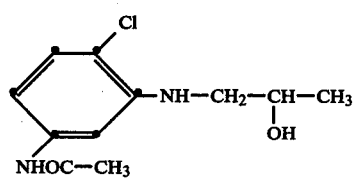

in the form of a solution in acetic acid is added to the diazo solution at 0°–5°, after which the pH is brought to 2 by adding ammonium acetate. After completion of coupling, the coupling product of the formula

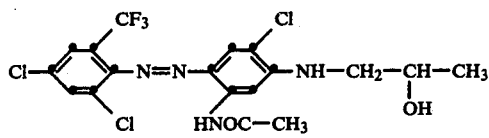

is isolated as a yellowish brown powder, which gives a yellow solution in dimethylformamide.

If the same procedure is repeated but in place of the coupling component employed above, equivalent amounts of the coupling components of the formulae

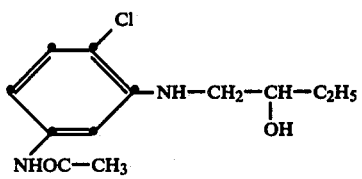

-continued and

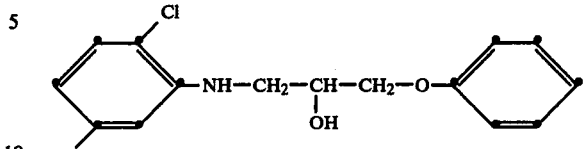

are used, the coupling products of the formulae

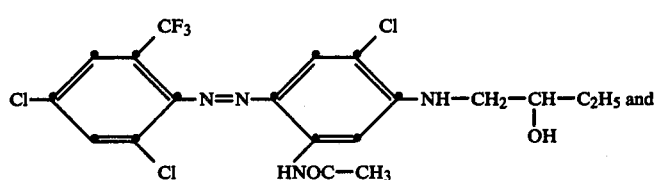

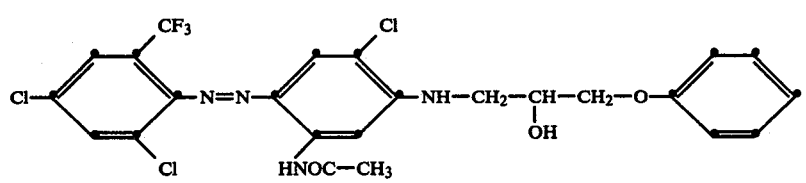

are respectively obtained.

If the same procedure is repeated but in place of the coupling components employed above those described in the preceding examples and in Tables 1 and 2 are used, the coupling products shown in Table 5 are obtained.

TABLE 5

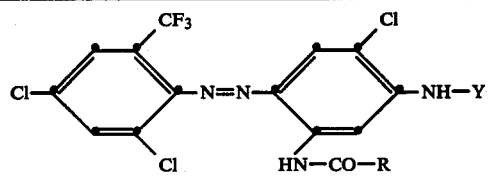

| No. | R | Y | Colour of solution in dimethylformamide |
|---|---|---|---|
| 102 | —CH₃ | —CH₂—CH₂—O—CH₂—CH₂—CN | yellow |
| 103 | " | —CH₂—CH₂—OOC—CH₃ | " |
| 104 | " | —C₂H₄—OOC—C₂H₄—OH | " |
| 105 | " | —CH₂—CH₂—CH₂—OH | " |
| 106 | " | —CH₂—CH₂—CH₂—CH₂—OH | " |
| 107 | " | —CH₂—CH₂—OCH₃ | " |
| 108 | " | —C₂H₄—O—C₂H₅ | " |
| 109 | " | —C₂H₄—O—C₂H₄—OCH₃ | " |
| 110 | " | —CH₂—CH₂—O—⌬ | " |

TABLE 5-continued

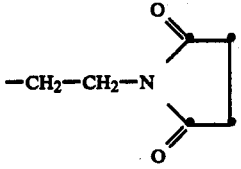

| No. | R | Y | Colour of solution in dimethylformamide |
|---|---|---|---|
| 111 | " | -CH$_2$-CH$_2$-N(succinimide) | " |
| 112 | " | -CH$_2$-CH$_2$-N(2-pyrrolidinone) | " |
| 113 | " | -C$_2$H$_4$-N(CH$_2$)(OC-CH$_3$) | " |
| 114 | " | -C$_2$H$_4$-CON(CH$_3$)(CH$_2$-CH$_2$-OH) | " |
| 115 | " | -CH$_2$-CH$_2$-COOCH$_3$ | " |
| 116 | " | -CH$_2$-CH$_2$-COOC$_2$H$_5$ | " |
| 117 | " | -C$_2$H$_4$-COO-C$_2$H$_4$-OH | " |
| 118 | " | -C$_2$H$_4$-COO-C$_2$H$_4$-OCH$_3$ | " |
| 119 | " | -C$_2$H$_4$-COO-C$_2$H$_4$-OC$_2$H$_5$ | " |
| 120 | " | -CH$_2$-CH$_2$-COO-CH$_2$-(furyl) | " |
| 121 | -O-C$_2$H$_4$-OCH$_3$ | -CH$_2$-CH$_2$-CH$_2$-CH$_3$ | " |
| 122 | -OC$_2$H$_5$ | -CH$_2$-CH$_2$-CH$_2$-CH$_3$ | " |
| 123 | -CH$_2$-OCH$_3$ | -CH$_2$-CH$_2$-CH$_2$-CH$_3$ | " |
| 124 | -O-C$_2$H$_4$-OCH$_3$ | -CH$_2$-CH(OH)-CH$_3$ | " |
| 125 | -OC$_2$H$_5$ | -CH$_2$-CH(OH)-CH$_3$ | " |
| 126 | -CH$_2$-OCH$_3$ | -CH$_2$-CH(OH)-CH$_3$ | " |
| 127 | -CH$_3$ | -CH$_2$-CH(OH)-CH$_2$-O-C$_4$H$_9$-(n) | " |
| 128 | " | -CH$_2$-CH(OH)-CH$_2$-OH | " |
| 129 | " | -CH$_2$-CH(OH)-CH$_2$-OOC-CH$_3$ | " |

TABLE 5-continued

| No. | R | Y | Colour of solution in dimethylformamide |
|---|---|---|---|
| 130 | " | —CH$_2$—CH(OH)—CH$_2$—OOC—C$_2$H$_5$ | " |
| 131 | " | —CH$_2$—CH(OH)—CH$_2$—OOC—C$_6$H$_5$ | " |
| 132 | " | —CH$_2$—CH(OH)—CH$_2$Cl | " |

EXAMPLE 133

A mixture consisting of 10.8 g of the compound of the formula

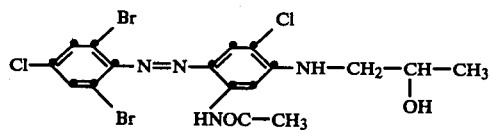

4 g of Cu(I) cyanide and 20 ml of dimethylsulfoxide is stirred for 4 hours at a temperature of 48°–50°, after which 20 ml of n-butanol are added and the mixture is allowed to cool, with stirring. The resulting dye of the formula

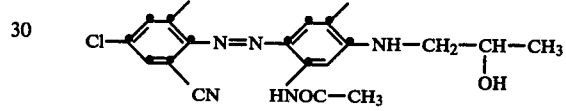

is isolated by filtration on a suction filter, and is washed with a 1:1 mixture of dimethylsulfoxide and n-butanol and finally with methanol. To purify the product and remove copper salts, the dye is recrystallised from n-butanol. The dye forms a dark red powder which gives a bluish-tinged red solution in dimethylformamide.

When this dye is applied to polyester materials as a disperse dye, by the dyeing processes customary for this category of dyes, brilliant bluish-tinged red dyeings are obtained, which are distinguished by very good light fastness and good sublimation fastness.

If the procedure described is repeated but in place of the educt mentioned above, equivalent amounts of the educts of the formulae

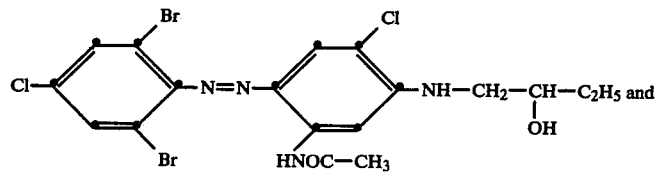

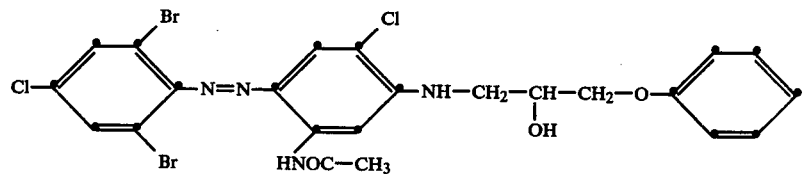

are employed, the dyes of the formulae

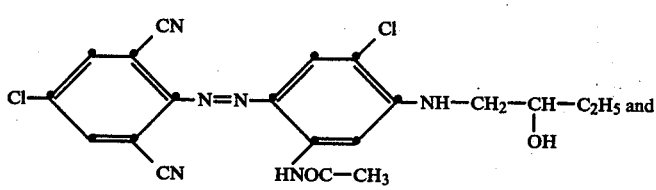

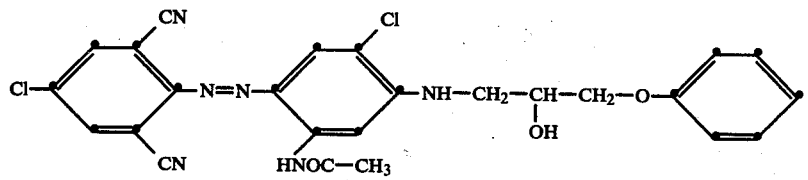

which have similar properties to the preceding dye, are respectively obtained.

If the same procedure is followed except that in place of the above educts equivalent amounts of the coupling products of Table 3 are employed, the corresponding dyes shown in Table 6 are obtained. When these are applied, as disperse dyes, to polyester materials, they give red dyeings having good fastness characteristics.

TABLE 6

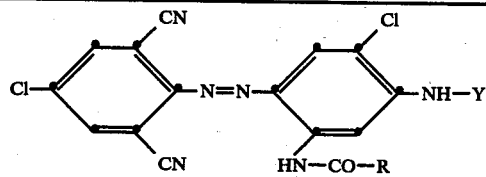

| No. | R | Y | Shade on polyethylene glycol terephthlate fibers (polyester) |
|-----|-----|-----|-----|
| 134 | —$CH_3$ | —$CH_2$—$CH_2$—O—$CH_2$—$CH_2$—CN | red |
| 135 | " | —$CH_2$—$CH_2$—OOC—$CH_3$ | " |
| 136 | " | —$C_2H_4$—OOC—$C_2H_4$—OH | " |
| 137 | " | —$CH_2$—$CH_2$—$CH_2$—OH | " |
| 138 | " | —$CH_2$—$CH_2$—$CH_2$—$CH_2$—OH | " |
| 139 | " | —$C_2H_4$—O—$CH_3$ | " |
| 140 | " | —$C_2H_4$—O—$C_2H_5$ | " |
| 141 | " | —$C_2H_4$—O—$C_2H_4$—$OCH_3$ | " |
| 142 | " | —$CH_2$—$CH_2$—O—⌬ | " |
| 143 | " | —$CH_2$—$CH_2$—N(succinimide) | " |
| 144 | " | —$CH_2$—$CH_2$—N(β-lactam) | " |
| 145 | " | —$CH_2$—$CH_2$—N($CH_3$)(OC—$CH_3$) | " |
| 146 | " | —$CH_2$—$CH_2$—CON($CH_3$)($CH_2$—$CH_2$—OH) | " |

TABLE 6-continued

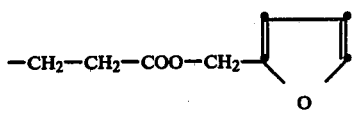

| No. | R | Y | Shade on polyethylene glycol terephthlate fibers (polyester) |
|---|---|---|---|
| 147 | " | —CH₂—CH₂—COOCH₃ | " |
| 148 | " | —CH₂—CH₂—COOC₂H₅ | " |
| 149 | " | —C₂H₄—COO—C₂H₄—OH | " |
| 150 | " | —C₂H₄—COO—C₂H₄—OCH₃ | " |
| 151 | " | —C₂H₄—COO—C₂H₄—OC₂H₅ | " |
| 152 | " | —CH₂—CH₂—COO—CH₂—(furyl) | " |
| 153 | —O—C₂H₄—OCH₃ | —CH₂—CH₂—CH₂—CH₃ | " |
| 154 | —OC₂H₅ | —CH₂—CH₂—CH₂—CH₃ | " |
| 155 | —CH₂—OCH₃ | —CH₂—CH₂—CH₂—CH₃ | " |
| 156 | —O—C₂H₄—OCH₃ | —CH₂—CH(OH)—CH₃ | " |
| 157 | —OC₂H₅ | —CH₂—CH(OH)—CH₃ | " |
| 158 | —CH₂—OCH₃ | —CH₂—CH(OH)—CH₃ | " |
| 159 | —CH₃ | —CH₂—CH(OH)—CH₂—O—C₄H₉—(n) | " |
| 160 | " | —CH₂—CH(OH)—CH₂—OH | " |
| 161 | " | —CH₂—CH(OH)—CH₂—OOC—CH₃ | " |
| 162 | " | —CH₂—CH(OH)—CH₂—OCC—C₂H₅ | " |
| 163 | " | —CH₂—CH(OH)—CH₂—OOC—(phenyl) | " |
| 164 | " | —CH₂—CH(OH)—CH₂—Cl | " |

EXAMPLE 165

A mixture consisting of 11.45 g of the compound of the formula

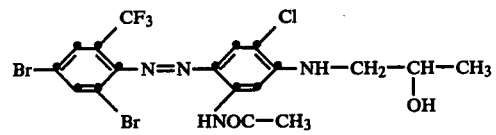

2 g of copper (I) cyanide and 20 ml of dimethylsulfoxide is stirred for 4 hours at a temperature of 48°–50°, after which 20 ml of n-butanol are added and the mixture is allowed to cool, with stirring. The resulting precipitate of dye is isolated on a suction filter and washed first with a 1:1 mixture of n-butanol and dimethylsulfoxide and then with methanol. For purification, the dye is recrystallised from n-butanol, with clarifying of the dye solution. When the dye obtained, of the formula

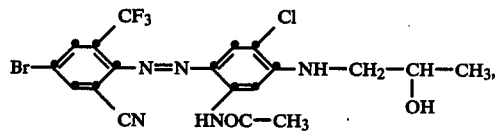

is dried in vacuo at 80°, a red powder is obtained, which gives a bluish-tinged red solution in dimethylformamide.

When this product is applied as a disperse dye to polyester materials, bluish-tinged red dyeings having good fastness characteristics, especially good light fastness, are obtained.

If the procedure described is repeated but in place of the educt mentioned above equivalent amounts of the educts of the formulae

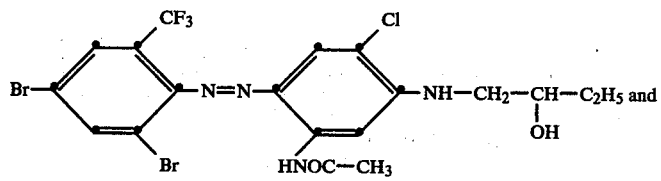

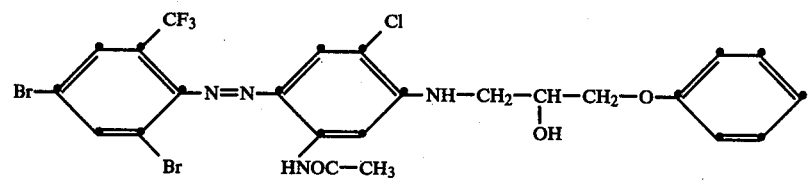

are used, the dyes of the formulae

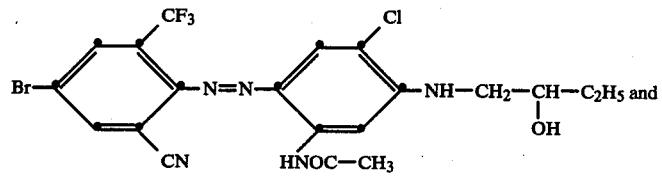

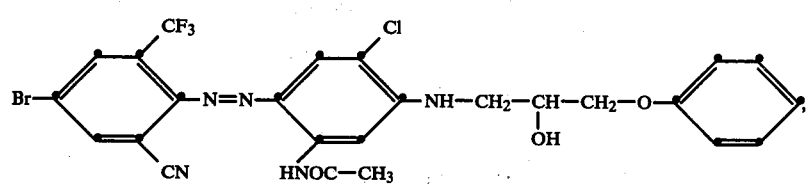

which have similar good properties, are respectively obtained.

If the same procedure is repeated but in place of the educts mentioned above, the compounds of Example 69 and Table 4 are used, the corresponding dyes shown in Table 7 below are obtained. Dyeings obtained with these dyes on polyester materials (PES) also show good fastness characteristics.

TABLE 7

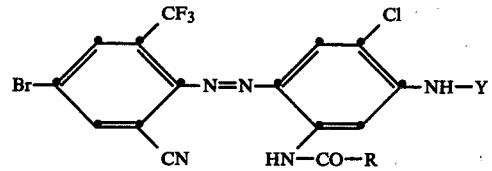

| No. | R | Y | Shade on PES |
|---|---|---|---|
| 166 | —CH$_3$ | —CH$_2$—CH$_2$—O—CH$_2$—CH$_2$—CN | red |
| 167 | " | —CH$_2$—CH$_2$—OOC—CH$_3$ | " |
| 168 | " | —CH$_2$—CH$_2$—OOC—CH$_2$—CH$_2$—OH | " |
| 169 | " | —CH$_2$—CH$_2$—CH$_2$—OH | " |
| 170 | " | —CH$_2$—CH$_2$—CH$_2$—CH$_2$—OH | " |
| 171 | " | —CH$_2$—CH$_2$—OCH$_3$ | " |
| 172 | " | —CH$_2$—CH$_2$—OC$_2$H$_5$ | " |
| 173 | " | —C$_2$H$_4$—O—C$_2$H$_4$—OCH$_3$ | " |

TABLE 7-continued

Structure: Br, CF₃, CN substituted phenyl —N=N— Cl, HN—CO—R, NH—Y substituted phenyl

| No. | R | Y | Shade on PES |
|-----|---|---|--------------|
| 174 | " | —CH₂—CH₂—O—C₆H₅ (phenyl) | " |
| 175 | " | —CH₂—CH₂—N(succinimide) | " |
| 176 | " | —CH₂—CH₂—N(2-pyrrolidinone) | " |
| 177 | " | —CH₂—CH₂—N(CH₃)(OC—CH₃) | " |
| 178 | " | —CH₂—CH₂—CON(CH₃)(CH₂—CH₂—OH) | " |
| 179 | " | —CH₂—CH₂—COOCH₃ | " |
| 180 | " | —CH₂—CH₂—COOC₂H₅ | " |
| 181 | " | —CH₂—CH₂—COO—C₂H₄—OH | " |
| 182 | " | —CH₂—CH₂—COO—C₂H₄—OCH₃ | " |
| 183 | " | —CH₂—CH₂—COO—C₂H₄—OC₂H₅ | " |
| 184 | " | —CH₂—CH₂—COO—CH₂—(furyl) | " |
| 185 | —O—C₂H₄—OCH₃ | —CH₂—CH₂—CH₂—CH₃ | " |
| 186 | —OC₂H₅ | " | " |
| 187 | —CH₂—OCH₃ | " | " |
| 188 | —O—C₂H₄—OCH₃ | —CH₂—CH(OH)—CH₃ | " |
| 189 | —OC₂H₅ | " | " |
| 190 | —CH₂—OCH₃ | " | " |
| 191 | —CH₃ | —CH₂—CH(OH)—CH₂—O—C₄H₉—n | " |
| 192 | " | —CH₂—CH(OH)—CH₂—OH | " |
| 193 | " | —CH₂—CH(OH)—CH₂—OOC—CH₃ | " |

TABLE 7-continued

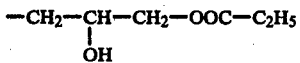

| No. | R | Y | Shade on PES |
|-----|---|---|--------------|
| 194 | " | —CH$_2$—CH(OH)—CH$_2$—OOC—C$_2$H$_5$ | " |
| 195 | " | —CH$_2$—CH(OH)—CH$_2$—OOC—C$_6$H$_5$ | " |
| 196 | " | —CH$_2$—CH(OH)—CH$_2$—Cl | " |

EXAMPLE 197

A mixture consisting of 9.65 g of the compound of the formula

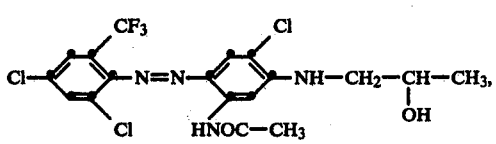

2 g of copper(I) cyanide and 20 ml of dimethylsulfoxide is stirred for 2 hours at a temperature of 98°-100°, after which 20 ml of n-butanol are added and the mixture is allowed to cool, with stirring. It is then stirred for a further 30 minutes at room temperature, after which the product formed is isolated by filtration on a suction filter. The product is washed with a 1:1 mixture of n-butanol and dimethylsulfoxide until the filtrate shows a pure red colour and is lastly washed with methanol. It is then purified by recrystallisation from n-butanol, coupled with clarifying of the solution by filtration. The dye thus obtained, of the formula

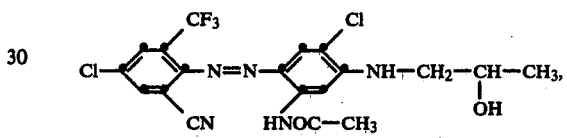

when dried in vacuo at 80°, forms a red powder which gives a red solution in dimethylformamide. When the product is applied as a disperse dye to polyester materials, bluish-tinged red dyeings having good fastness characteristics, especially good light fastness, are obtained.

If the same procedure is repeated but in place of the compound mentioned above, equivalent amounts of the compounds of the formulae

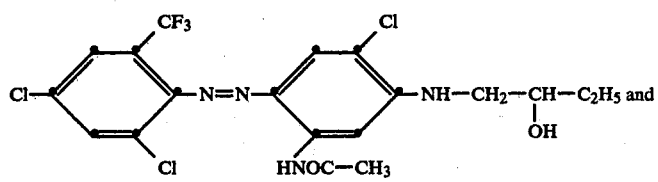

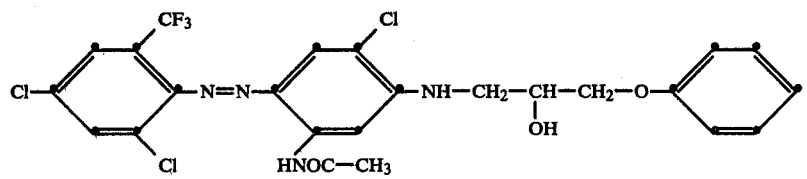

are employed, the dyes of the formulae

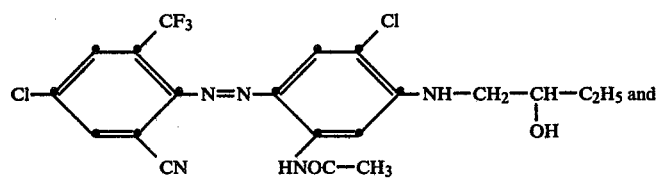

-continued

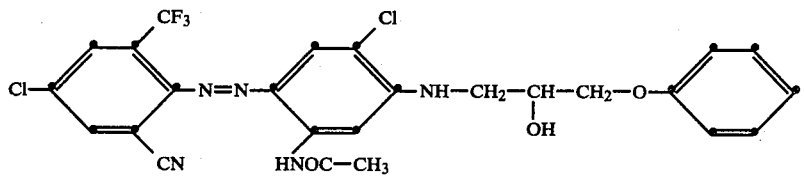

are respectively obtained. When these products are used as disperse dyes to dye polyester materials, the dyeings obtained show similar good fastness characteristics.

If the same procedure is followed but in place of the educts used above, equivalent amounts of the compounds of Example 101 and of Table 5 are employed, the corresponding dyes, listed in Table 8 below, are obtained. When these are used as disperse dyes to dye polyester materials, the dyeings obtained again have good fastness characteristics.

TABLE 8

![structure: Cl–C6H2(CF3)(CN)–N=N–C6H2(Cl)(HN–CO–R)–NH–Y]

| No. | R | Y | Shade on polyester materials |
|---|---|---|---|
| 198 | —CH₃ | —CH₂—CH₂—O—CH₂—CH₂—CN | red |
| 199 | " | —CH₂—CH₂—OOC—CH₃ | " |
| 200 | " | —CH₂—CH₂—OOC—CH₂—CH₂—OH | " |
| 201 | " | —CH₂—CH₂—CH₂—OH | " |
| 202 | " | —CH₂—CH₂—CH₂—CH₂—OH | " |
| 203 | " | —CH₂—CH₂—OCH₃ | " |
| 204 | " | —CH₂—CH₂—O—C₂H₅ | " |
| 205 | " | —C₂H₄—O—C₂H₄—OCH₃ | " |
| 206 | " | —CH₂—CH₂—O—C₆H₅ | " |
| 207 | " | —CH₂—CH₂—N(phthalimide) | " |
| 208 | " | —CH₂—CH₂—N(succinimide type) | " |
| 209 | " | —CH₂—CH₂—N(CH₃)(OC—CH₃) | " |

TABLE 8-continued

![structure: Cl–C6H2(CF3)(CN)–N=N–C6H2(Cl)(HN–CO–R)–NH–Y]

| No. | R | Y | Shade on polyester materials |
|---|---|---|---|
| 210 | " | —CH₂—CH₂—CON(CH₃)(CH₂—CH₂—OH) | " |
| 211 | " | —CH₂—CH₂—COOCH₃ | " |
| 212 | " | —CH₂—CH₂—COOC₂H₅ | " |
| 213 | " | —CH₂—CH₂—COO—C₂H₄—OH | " |
| 214 | " | —CH₂—CH₂—COO—C₂H₄—OCH₃ | " |
| 215 | " | —CH₂—CH₂—COO—C₂H₄—OC₂H₅ | " |
| 216 | " | —CH₂—CH₂—COO—CH₂—(furan) | " |
| 216a | " | —CH₂—CH(OH)—CH₂—Cl | " |

EXAMPLE 216 b

A mixture consisting of 5.60 g of the compound of the formula

![structure: Cl–C6H2(CF3)(Br)–N=N–C6H2(Cl)(HNOC–CH3)–NH–CH2–CH(OH)–CH2–Cl]

0.90 g of sodium acetate, 0.10 g of potassium iodide and 30 ml of dimethylsulfoxide is stirred for 12 hours at a temperature of 88°–90°, and is then allowed to cool to 40°. 1.0 g of cuprous cyanide is added and the mixture is then stirred for a further 3 hours at 38°–40°. Thereupon 3 ml of methanol are added, the mixture is allowed to cool to room temperature and after 2 hours the product which has precipitated is isolated by filtration. It is washed first with a 10:1 mixture of dimethylsulfoxide and methanol and then with methanol alone, after which the dye obtained, of the formula

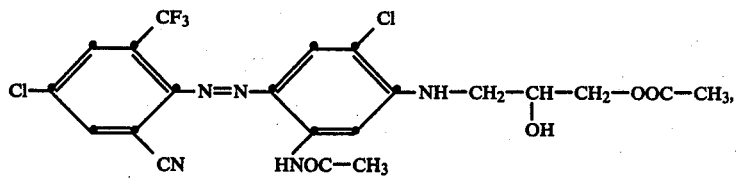

is dried in vacuo at 70°. The dye gives a red powder which gives a bluish-tinged red solution in dimethylformamide.

EXAMPLE 217

A mixture consisting of 18.6 g of the dye of the formula

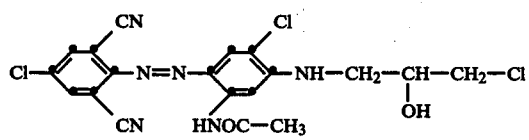

(obtained by diazotising 2,6-dicyano-4-chloro-aniline and coupling the product with the coupling component of the formula

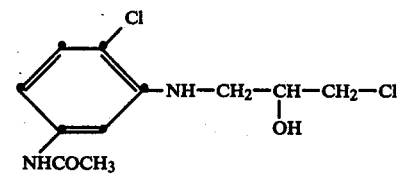

in a known manner), 2.2 g of sodium cyanide and 30 ml of dimethylsulfoxide is stirred for 6 hours at a temperature of 33°–35°, after which the resulting dye, of the formula

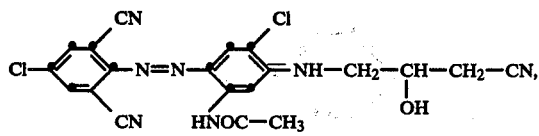

is precipitated by adding water. The dye is isolated by filtration on a suction filter and is then washed with water and dried. The dye thus obtained is a red powder which gives a red solution in dimethylformamide.

When the product is applied as a disperse dye to polyester materials, brilliant red dyeings, having good light fastness and sublimation fastness, are obtained.

If the same procedure is repeated but in place of the dye employed above, equivalent amounts of the dyes of the formulae

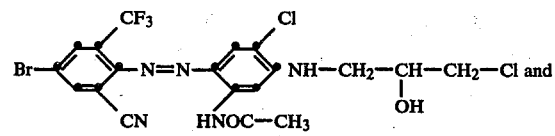

-continued

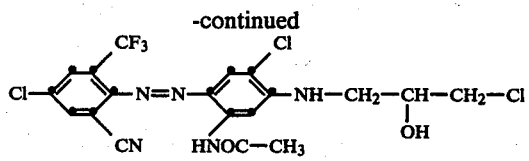

are used, the dyes of the formulae

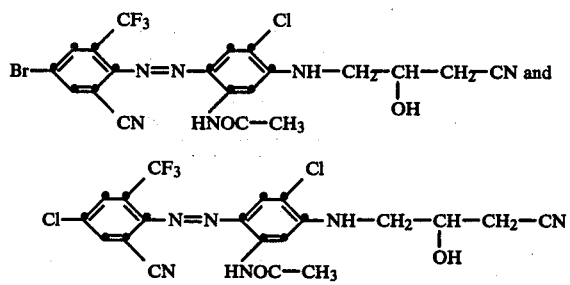

are respectively obtained. When these are applied as disperse dyes to polyester materials, they give red dyeings with similar good fastness characteristics.

EXAMPLE 218

A mixture consisting of 8.6 g of the dye of the formula

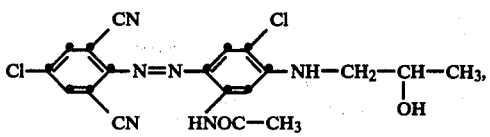

40 ml of acetic acid, 3 g of acetic anhydride and 1 ml of pyridine is stirred at a temperature of 60° until educt is no longer detectable in a thin layer chromatogram. The mixture is allowed to cool to room temperature and a part of the acetic acid is neutralised at 20°–25° by dropwise addition of sodium hydroxide solution, whereupon the dye formed, of the formula

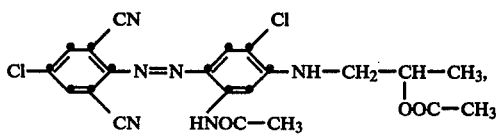

separates out. The dye is filtered off on a suction filter, washed and then dried in vacuo at 80°.

When this dye is applied as a disperse dye to polyester materials, it gives brilliant red dyeings, which are distinguished by good light fastness and sublimation fastness.

If the same procedure is repeated but in place of the dye mentioned above, equivalent amounts of dyes described earlier in this text are used, with acetic anhydride or an equivalent amount of propionic anhydride as the acylating agent, the dyes shown in Table 9 below are obtained. When these are applied as disperse dyes to polyester materials, they give red dyeings having good fastness characteristics, in particular good light fastness and sublimation fastness.

TABLE 9

Hal—⬡(X, CN)—N=N—⬡(Cl, HNOC—CH₃)—NH—CH₂—CH(O—R₁)—CH₂—R₂

| No. | X | Hal | R₁ | R₂ | Shade on polyester |
|---|---|---|---|---|---|
| 219 | —CN | —Cl | —OC—C₂H₅ | —H | red |
| 220 | —CN | —Cl | —OC—CH₃ | —CH₃ | " |
| 221 | —CN | —Cl | —OC—C₂H₅ | —CH₃ | " |
| 222 | —CF₃ | —Br | —OC—CH₃ | —H | " |
| 223 | —CF₃ | —Br | —OC—C₂H₅ | —H | " |
| 224 | —CF₃ | —Br | —OC—CH₃ | —CH₃ | " |
| 225 | —CF₃ | —Br | —OC—C₂H₅ | —CH₃ | " |
| 226 | —CF₃ | —Cl | —OC—CH₃ | —H | " |
| 227 | —CF₃ | —Cl | —OC—C₂H₅ | —H | " |
| 228 | —CF₃ | —Cl | —OC—CH₃ | —CH₃ | " |
| 229 | —CF₃ | —Cl | —OC—C₂H₅ | —CH₃ | " |

EXAMPLE 230

18.5 g of 2-aminophenyl ethyl-sulfone are introduced into 100 g of 65% sulfuric acid at a temperature of 55°–60°, and the mixture is stirred until all has dissolved and is then diluted with 50 g of 36% hydrochloric acid. 30.8 g of 25% aqueous hydrogen peroxide are then added dropwise in the course of about 1½ hours at a temperature of 58°–60°, with vigorous stirring. Stirring is continued for 30 minutes at about 60°, the mixture is then allowed to cool, and the product which precipitates, of the formula

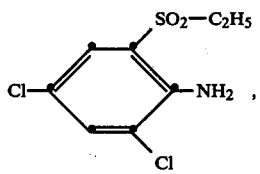

is isolated by filtration. The product forms colourless crystals which easily dissolve in dimethylformamide.

If the same procedure is repeated but in place of the amine employed above, an equivalent amount of 2-aminophenyl methyl sulfone is used, the product of the formula

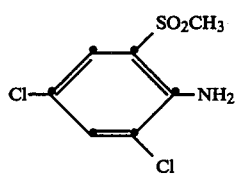

is obtained.

If in place of the amine employed above, an equivalent amount of 2-aminobenzene-sulfonyldiethylamide is used and the chlorination is carried out in a mixture of acetic acid and hydrochloric acid at room temperature, the compound of the formula

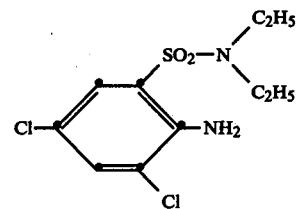

is obtained.

If, in the above example, an equivalent amount of the N-methyl-N-hydroxyethylsulfonamide is employed instead of the sulfonyldiethylamide, the compound of the formula

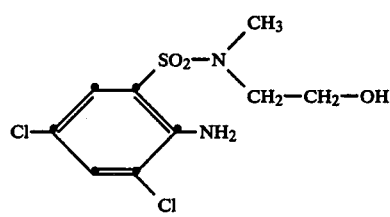

is obtained.

EXAMPLE 231

10.1 g of the compound of the formula

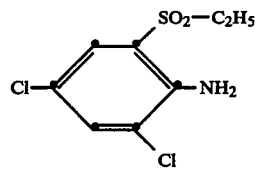

are diazotised in a mixture of propionic acid and glacial acetic acid at a temperature of 0°–5°. A solution of 8.90 g of the compound of the formula

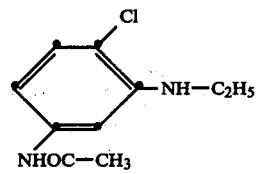

(prepared by akylating 3-amino-4-chloroacetanilide with diethyl sulfate) in glacial acetic acid is added to the diazo solution, after which the pH value is brought to 2 by adding a 30% aqueous solution of ammonium acetate. After completion of coupling, the pH is brought to about 4, the mixture is diluted with water, and the coupling product formed, of the formula

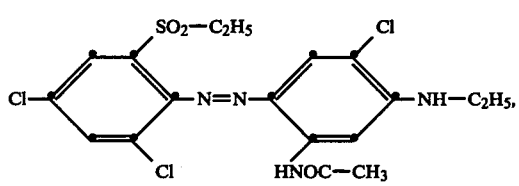

is isolated by filtration and then dried in vacuo at 80°. The product forms a yellowish brown powder which gives a yellow solution in dimethylformamide.

If the same procedure is repeated but in place of the diazo component used above, equivalent amounts of the dichloroanilines described above are employed, the coupling products of the formulae

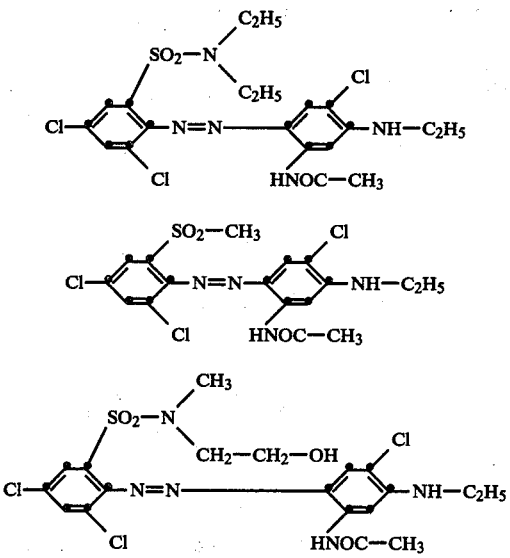

are obtained.

EXAMPLE 232

A mixture consisting of 9.5 g of the compound of the formula

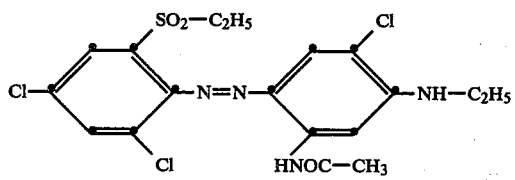

2 g of copper(I) cyanide and 20 ml of dimethylsulfoxide is stirred for 2 hours at a temperature of 98°–100°. It is then diluted with 20 ml of n-butanol and allowed to cool, and the dye of the formula

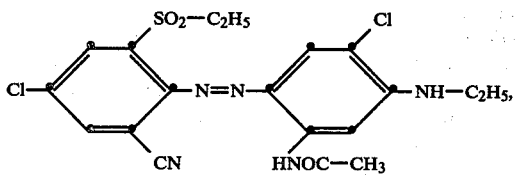

which has precipitated, is filtered off and washed with a 1:1 mixture of n-butanol and dimethylsulfoxide and finally with methanol. To remove copper salts, the product is suspended in 200 ml of a 2% aqueous solution of ethylenediamine at room temperature, and is then filtered off and washed first with 2% ethylenediamine solution and then with water.

After having been dried in vacuo at 80°, the dye is a red powder, which gives a red solution in dimethylformamide.

The red dyeings obtained by applying this dye, as a disperse dye, to polyester materials have good fastness to sublimation and light.

If the same procedure is repeated but in place of the educt employed above, the coupling products described at the end of Example 231 are used, the dyes of the formulae

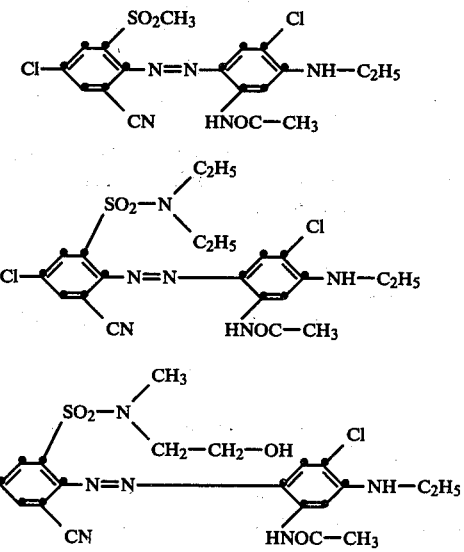

are obtained. These also give red dyeings, having good fastness characteristics, on polyester materials.

EXAMPLE 233

10.5 g of the compound of the formula

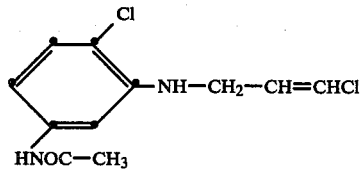

(prepared by alkylating 3-amino-4-chloro-acetanilide with 1,3-dichloropropene), as a solution in ethylcellosolve, are added to a solution containing 4/100 mol of the diazonium compound of the formula

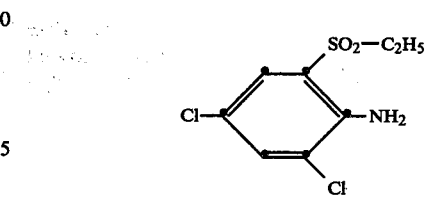

the pH is then brought to 2 with ammonium acetate and the mixture is stirred at 0°–5° until coupling is complete. The resulting coupling product, of the formula

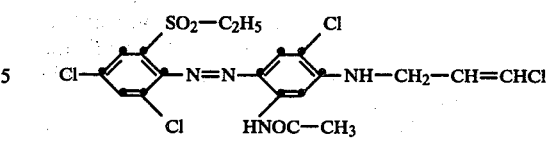

is isolated and dried, affording a yellow powder which gives a yellow solution in dimethylformamide.

If the above procedure is repeated but 4/100 mol of the diazonium compound of the diazo component of the formula

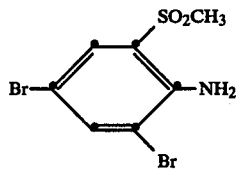

(obtained by brominating 2-aminophenyl methyl sulfone in 20% hydrochloric acid) is used, the coupling product of the formula

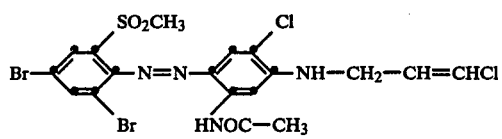

is obtained; this has similar properties to those of the preceding product.

EXAMPLE 234

A mixture consisting of 10.45 g of the compound of the formula

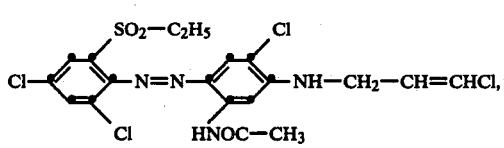

2 g of copper(I) cyanide and 20 ml of dimethylsulfoxide is stirred for 2 hours at a temperature of 98°–100°, after which it is diluted with 20 ml of n-butanol and allowed to crystallise. When the mixture has cooled, the dye obtained, of the formula

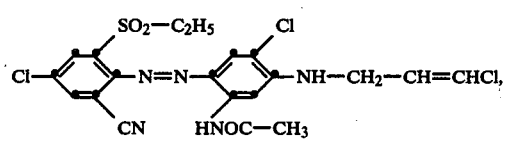

is filtered off, washed with a mixture of butanol and dimethylsulfoxide and finally with methanol, and freed from copper by treatment with an ethylenediamine solution. On drying, the dye forms a red powder, which gives a red solution in dimethylformamide.

The red dyeings produced with this dye on polyester have good fastness to light and to sublimation.

If the place of the 10.45 g of the compound mentioned at the outset, an equivalent amount of the azo compound of the formula

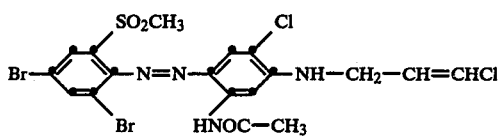

is employed and the reaction is carried out with cuprous cyanide at a temperature of 38°–40°, but in other respects analogously to the above method, the dye of the formula

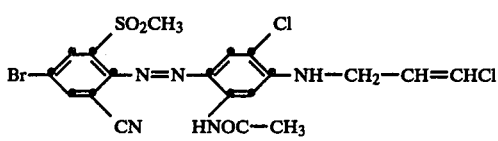

is obtained.

This dye gives bluish-tinged red dyeings on polyester and has good affinity. The dyeings have good fastness to light and to sublimation and exhibit good wool reserve.

EXAMPLE 235

1 part of the dry, extender-free dye of the formula

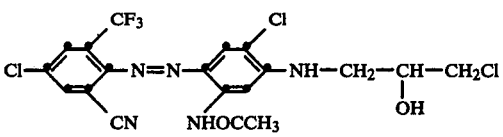

is mixed with 1 part of the dry extender-free dye of the formula

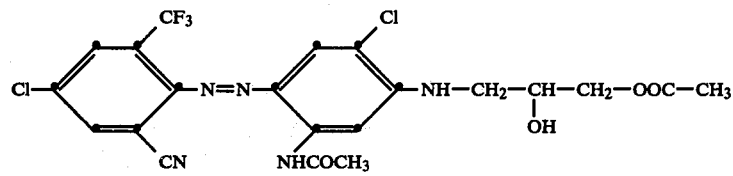

and the mixture obtained, together with 1 part of Na dinaphthylmethanedisulfonate, and with water, is introduced into a glass bead mill and milled therein until the particle size is about 2μ or less. The paste obtained, consisting of the dye mixture, dispersant and water, is then mixed with 3 parts of sodium ligninsulfonate. This paste is then spray-dried, giving a dye preparation in powder form.

This dye preparation can be used to dye polyester materials, for example by the HT method, the dye bath exhibiting good dispersion stability. A red dyeing, having good light fastness, is obtained on the polyester.

EXAMPLE 236

2 parts of the dye obtained according to Example 133 are dispersed in 4,000 parts of water. 12 parts of the sodium salt of o-phenylphenol and 12 parts of diammonium phosphate are added to this dispersion, and 100 parts of polyethylene glycol terephthalate yarn are dyed in this liquor for 90 minutes at 95°–98°.

The dyeing is then rinsed and after-treated with aqueous sodium hydroxide solution and a dispersant. This gives a brilliant light-fast and sublimation-fast bluish-tinged red dyeing.

EXAMPLE 237

1 part of the dye obtained according to Example 133 is milled wet with 2 parts of a 50% aqueous solution of sodium dinaphthylmethanedisulfonate, and the mixture is dried.

This dye preparation is stirred with 40 parts of a 10% aqueous solution of sodium N-benzylheptadecyl-benzimidazoledisulfonate and 4 parts of 40% acetic acid solution are added. 4,000 parts of a dye bath are prepared from this mixture by dilution with water.

100 parts of a polyester fibre material are introduced into this bath at 50°, the temperature is raised to 120°–130° in the course of half an hour, and the fibres are dyed for one hour in the closed apparatus, at this temperature. They are then rinsed thoroughly. A brilliant bluish-tinged red dyeing having good light fastness and sublimation fastness is obtained.

EXAMPLE 238

A polyethylene glycol terephthalate woven fabric is impregnated on a padder, at 40°, with a liquor composed of 20 parts of the dye obtained according to Example 133, finely dispersed in 10 parts of sodium alginate, 20 parts of triethanolamine, 20 parts of octylphenol polyglycol ether and 930 parts of water.

The fabric is squeezed off to about 100% wet pickup, dried at 100° and then fixed for 30 seconds at a temperature of 210°. The dyed goods are rinsed with water, soaped and dried. A brilliant light-fast and sublimation-fast bluish-tinged red dyeing is obtained.

What is claimed is:

1. A monoazo compound, or a mixture of different azo compounds, of the formula

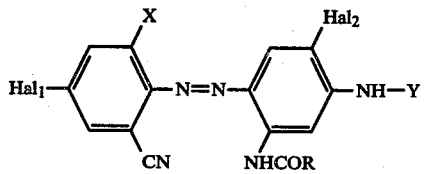

in which $Hal_1$ and $Hal_2$ independently of one another are halo, X is $CF_3$, R is $C_1$–$C_{14}$-alkyl which is unsubstituted or substituted by halo or $C_1$–$C_4$-alkoxy, or $C_1$–$C_4$-alkoxy or $C_1$–$C_4$-alkoxy-$C_1$–$C_4$-alkoxy and Y is $C_1$–$C_8$-alkyl which is unsubstituted or substituted by hydroxy, $C_1$–$C_4$-alkoxy, cyano-$C_1$–$C_4$-alkoxy, $C_1$–$C_4$-alkoxy-$C_1$–$C_4$-alkoxy, halo, cyano, phenoxy, —COO-phenyl, —COO—$C_1$–$C_4$-alkyl in which alkyl is unsubstituted or substituted by furyl, hydroxy or $C_1$–$C_4$-alkoxy, —N(CO—$C_1$–$C_4$-alkyl) ($C_1$–$C_4$-alkyl) wherein alkyl is unsubstituted or substituted by hydroxy,

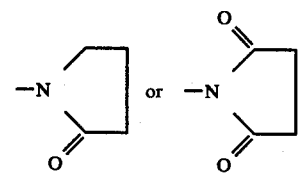

or Y is $C_3$–$C_4$-alkenyl or halo-$C_3$–$C_4$-alkenyl.

2. A monoazo compound of claim 1, in which $Hal_1$ is bromo.

3. A monoazo compound of claim 1, in which $Hal_2$ is chloro.

4. A monoazo compound of claim 1, in which R is unsubstituted $C_1$–$C_4$-alkyl.

5. A monoazo compound of claim 4, in which R is methyl.

6. A monoazo compound of claim 1, in which Y is $C_1$–$C_8$-alkyl substituted by hydroxy, $C_1$–$C_4$-alkoxy, cyano-$C_1$–$C_4$-alkoxy, $C_1$–$C_4$-alkoxy-$C_1$–$C_4$-alkoxy, halo, cyano, phenoxy, —COO-phenyl, —COO-$C_1$–$C_4$-alkyl in which alkyl is unsubstituted or substituted by furyl, hydroxy or $C_1$–$C_4$-alkoxy, —N(CO—$C_1$–$C_4$-alkyl) ($C_1$–$C_4$-alkyl) wherein alkyl is unsubstituted or substituted by hydroxy,

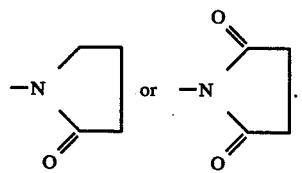

7. A monoazo compound of claim 6, in which Y is hydroxy $C_1$–$C_4$-alkyl.

8. A monoazo compound of claim 1, in which $Hal_1$ is chloro or bromo, $Hal_2$ is chloro, and Y is $C_2H_5$ which is unsubstituted or substituted by —$OC_2H_4CN$, —$OC_2H_4OCH_3$, —$OCH_3$, —$OC_2H_5$, —O—$C_6H_5$,

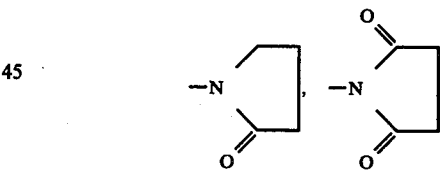

—$COOCH_3$, —$COOC_2H_5$, —$COOC_2H_4OH$, —$COOC_2H_4OCH_3$, —$COOC_2H_4OC_2H_5$,

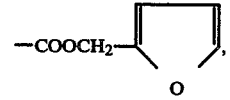

—$N(CH_3)(OCCH_3)$ or —$CON(CH_3)(C_2H_4OH)$ or Y is $C_3H_7$ which is unsubstituted or substituted by one or more identical or different substituents chosen from OH, Cl, CN, $OC_6H_5$, $OC_4H_9$, $COOC_6H_5$, $COOCH_3$ and $COOC_2H_5$, or Y is a $C_4H_9$ group which is unsubstituted or substituted by OH, $COOCH_3$ or $COOC_2H_5$, or Y is —$CH_2$—CH=CHCl.

* * * * *